US012334234B2

(12) United States Patent
Audhav et al.

(10) Patent No.: US 12,334,234 B2
(45) Date of Patent: Jun. 17, 2025

(54) AIR COOLED RESISTOR

(71) Applicant: Volvo Truck Corporation, Gothenburg (SE)

(72) Inventors: Tove Audhav, Landvetter (SE); Fredrik Rahm, Hörby (SE); Magnus Ising, Lund (SE); Arne Andersson, Mölnlycke (SE)

(73) Assignee: Volvo Truck Corporation, Gøteborg (SE)

( * ) Notice: Subject to any disclaimer, the term of this patent is extended or adjusted under 35 U.S.C. 154(b) by 357 days.

(21) Appl. No.: 17/969,910

(22) Filed: Oct. 20, 2022

(65) Prior Publication Data

US 2023/0154655 A1 May 18, 2023

(30) Foreign Application Priority Data

Nov. 17, 2021 (EP) .................................... 21208830

(51) Int. Cl.
*H01C 1/082* (2006.01)

(52) U.S. Cl.
CPC .................................... *H01C 1/082* (2013.01)

(58) Field of Classification Search
CPC ...................................................... H01C 1/082
See application file for complete search history.

(56) References Cited

U.S. PATENT DOCUMENTS

| | | | | |
|---|---|---|---|---|
| 1,807,441 A * | 5/1931 | Schurig | H01C 7/18 338/234 |
| 2019/0225052 A1 | 7/2019 | Zenner et al. | |
| 2020/0251259 A1 | 8/2020 | Rao et al. | |

FOREIGN PATENT DOCUMENTS

| | | | |
|---|---|---|---|
| DE | 8311964 | U1 | 3/1984 |
| DE | 202009005664 | U1 | 6/2009 |
| EP | 0247635 | A2 | 12/1987 |
| EP | 3040223 | A1 | 7/2016 |
| GB | 692688 | A | 6/1953 |
| JP | 2006035939 | A | 2/2006 |

OTHER PUBLICATIONS

Extended European Search Report for European Patent Application No. 21208830.6, mailed May 11, 2022, 9 pages.

* cited by examiner

*Primary Examiner* — Kyung S Lee
(74) *Attorney, Agent, or Firm* — Withrow & Terranova, PLLC

(57) ABSTRACT

An air cooled resistor arrangement comprising a first elongated tube member which is housed inside a second elongated tube member. The first and second elongated tube members are spaced apart from each other by an air gap for allowing a flow of air to flow through the first elongated tube member and the air gap.

15 Claims, 5 Drawing Sheets

AIR COOLED RESISTOR

RELATED APPLICATIONS

The present application claims priority to European Patent Application No. 21208830.6, filed on Nov. 17, 2021, and entitled "AIR COOLED RESISTOR," which is incorporated herein by reference in its entirety.

TECHNICAL FIELD

The present invention relates to an air cooled resistor arrangement. The air cooled resistor is advantageously incorporated into a vehicle and configured to dissipate electric power generated by an electric traction motor during braking. The present invention also relates to a vehicle comprising an electric traction motor for propelling the vehicle, as well as the air cooled resistor. Although the invention will mainly be directed to a vehicle in the form of a truck using an electric traction motor propelling the vehicle, the invention may also be applicable for other types of vehicles at least partially propelled by an electric traction motor, such as e.g. an electric vehicle, a hybrid vehicle comprising an electric machine as well as an internal combustion engine for propulsion.

BACKGROUND

The propulsion systems of vehicles are continuously developed to meet the demands from the market. A particular aspect relates to the emission of environmentally harmful exhaust gas. Therefore, vehicles propelled by electric machines and/or electric machine receiving electric power from hydrogen fuel cells have been increasingly popular, in particular for trucks and other heavy duty vehicles.

In comparison to a vehicle propelled solely by an internal combustion engine (ICE), a vehicle propelled by an electric machine conventionally struggles with obtaining the desired functionality of auxiliary braking. For an ICE operated vehicle, the auxiliary braking can be achieved by means of a retarder, etc. However, for an electric vehicle, the auxiliary braking functionality can be a dimensioning factor for the cooling system since the cooling capacity of e.g. a fuel cell electric vehicle (FCEV) as well as a battery electric vehicle (BEV) is a limiting factor. The reason is that for such type of vehicles, the auxiliary braking places a lot of energy in the cooling system.

There is thus a desire to provide a means for improving the dissipation of electric power when e.g. the vehicle battery is fully charged, i.e. when the so-called state-of-charge level is above a predetermined threshold limit.

SUMMARY

It is thus an object of the present invention to at least partially overcome the above described deficiencies.

According to a first aspect, there is provided an air cooled resistor arrangement, comprising a first elongated tube member comprising a first open inlet portion and a first open outlet portion, the first elongated tube member extending from the first open inlet portion to the first open outlet portion, a second elongated tube member comprising a second open inlet portion and a second open outlet portion, the second elongated tube member extending from the second open inlet portion to the second open outlet portion, an electrically conductive resistor element comprising an electric resistive material, the resistor element being connectable to a source of electric power, wherein the resistor element is arranged on a surface of the first elongated tube member, wherein the first elongated tube member is housed inside the second elongated tube member, the first elongated tube member and the second elongated tube member being spaced apart from each other continuously along the extension of the first elongated tube member by an air gap perpendicular to the extension of the first elongated tube member such that a flow of air entering the air cooled resistor arrangement is directed through the first elongated tube member and the air gap, and heated by the resistor element before being exhausted through the first and second open outlet portions.

The wording "tube member" should, if not explicitly referred to as otherwise, be construed as an elongated member which is open at its axial ends. The elongated member can have any suitable cross-sectional shape, such as e.g. a circular shape, the shape of a cylindric cylinder, an oval shape, a rectangular shape, etc.

Further, the electric resistive material, which may also be referred to as an electric resistance material, should be construed as a material which can resist the conduction of electric current, i.e. it has the ability to resist electric power. When receiving electric power, heat is generated in the electric resistive material. The electric resistive material e.g. be manufactured from ceramic materials, metal, metal alloys, etc. As is well known, the electrical resistivity of a material is different depending on the specific type of material used. The specific type of material used for the present invention is thus dependent on e.g. the application of use and the availability of such material. To put it differently, the skilled person can use the type of material that suits the application of use best.

The present invention is based on the insight that the use of a first and a second elongated tube member enables for an improved heat transfer of the air directed through the resistor arrangement, which air is configured to dissipate the electric power received by the electrically conductive resistor element from the source of electric power. In particular, by means of the present invention, air is flowing on each side of the electrically conductive resistor element which improves the heat transfer. Moreover, the air gap between the first and second elongated tube members provides an electrical insulation between the electrically conductive resistor element and the ambient environment outside the second elongated tube member. Also, the elongated tube members can be advantageously implemented to guide the heated air to a desired position of the vehicle.

Preferably, the cross-sectional flow area perpendicular to the flow direction along the first and second elongated tube members is small in comparison to the length of the longitudinal extension. Hereby, the air is able to flow through the first elongated tube member and the air gap at a relatively high air flow velocity.

In order to even further increase the heat transfer, the air cooled resistor arrangement may comprise turbulators. The turbulators may be provided inside the first elongated tube member and/or in the air gap formed between the first and second elongated tube members. Such turbulators may be formed by e.g. a radial protrusion arranged on the surface of the first and/or second elongated tube members. The protrusion hereby generates a turbulence of the flow of air, which may further increase the heat transfer.

According to an example embodiment, the second elongated tube member may be closed in a direction perpendicular to the elongation of the second elongated tube member between the second inlet portion and the second outlet portion. Hence, second elongated tube member is only open at the second inlet portion and the second outlet portion. Hereby, ambient air is prevented from reaching the air gap between the first and second elongated tube members. To put it differently, the second elongated tube member can hereby prevent the heat from the electrically conductive resistor element to reach the ambient environment. An advantage is thus that the second elongated tube member can form a heat shield to its ambient environment. This is particularly advantageous as the air cooled resistor can be positioned in the vicinity of components which are less heat resistant.

In a similar vein, and according to an example embodiment, the first elongated tube member may be closed in a direction perpendicular to the elongation of the first elongated tube member between the first inlet portion and the first outlet portion.

According to an example embodiment, the resistor element may extend between the first open inlet portion and the first open outlet portion. Hereby, the air directed through the first elongated tube member and the air gap between the first and second elongated tube members is heated throughout the entire travel along the elongated tube members.

According to an example embodiment, the air cooled resistor arrangement may further comprise at least one connecting element, the at least one connecting element connecting the first and second elongated tube members to each other. Hereby, the electrically conductive resistor element is kept in its desired position relative to the second elongated tube member. In yet further detail, the at least one connecting element advantageously ensures that a desired distance is provided between the first and second elongated tube members. Hence, the at least one connecting element provides for a desired air gap between the first and second elongated tube members.

According to an example embodiment, the at least one connecting element may be formed by an electrically insulating material. Hereby, the risk of accidentally electrifying the second elongated tube member is reduced.

According to an example embodiment, the first elongated tube member may comprise a heat conductive structure, the heat conductive structure is arranged on an inner wall portion of the first elongated tube member and extends in a direction perpendicular to the extension of the first elongated tube member and away from the second elongated tube member. The heat conductive structure thus extends towards a centre geometric axis of the first elongated tube member. An advantage is that the heat conductive structure is heated by the resistor element receiving electric power received from the source of electric power, thereby further improving the heat transfer through first and second elongated tube members.

According to an example embodiment, the heat conductive structure may extend in a direction parallel with the extension of the first elongated tube member. According to an example embodiment, the heat conductive structure may extend from the first open inlet portion to the first open outlet portion. An advantage is that the heat transfer is even further improved since the air will be heated by a larger area of material. The heat conductive structure may be arranged in different forms and shapes. According to an example embodiment, the heat conductive structure may be arranged in a honeycomb pattern. According to another example embodiment, the heat conductive structure may be formed by a plurality of taper shaped elements arranged on the inner wall portion of the first elongated tube member.

According to an example embodiment, the second elongated tube member may have a circular cross section. A circular cross section is particularly advantageous as it can sustain an air flow of relatively high pressure. The air cooled resistor arrangement can thus, for example, be arranged downstream an air compressor generating a flow of high pressurized air directed into the air cooled resistor.

According to an example embodiment, the first elongated tube member may have one of a circular cross section or a rectangular cross section.

According to an example embodiment, the resistor element may be formed by at least one resistor winding arranged around the surface of the first elongated tube member. Hereby, the first elongated tube member can be uniformly heated by electric power received through the resistor winding. Thus, a uniform heat distribution is provided.

According to a second aspect, there is provided a braking system for a vehicle, comprising an electric traction motor configured to propel the vehicle and to controllably regenerate electric power during regenerative braking of the vehicle, an electric machine comprising an output shaft, an air blower connected to the output shaft of the electric machine, the air blower being operable by the electric machine by rotation of the output shaft, wherein the air blower is arranged in an air conduit, an air cooled resistor arrangement according to any one of the example embodiments described above in relation to the first aspect, and a source of electric power electrically connected to the electric machine and to the electrically conductive resistor element of the air cooled resistor, the source of electric power comprising an electric storage system configured to receive and supply electric power, wherein the electric machine and the air cooled resistor arrangement are operated by electric power received from the electric power system, the electric power system being further electrically connected to the electric traction motor and configured to receive electric power during regenerative braking.

According to a third aspect, there is provided a vehicle, comprising an electric traction motor configured to propel the vehicle, a source of electric power comprising an electric storage system, wherein the source of electric power is electrically connected to the electric traction motor, and an air cooled resistor arrangement according to any one of the example embodiments described above in relation to the first aspect, wherein the electrically conductive resistor element is electrically connected to the source of electric power for dissipating electric power generated by the electric traction motor during braking.

The electric traction motor is thus arranged in a regenerative braking mode. It should however be observed that the regenerative braking mode should not necessarily be referred to as a mode where electric power is supplied to a vehicle battery. As is evident from the above, the electric power generated during regenerative braking can be supplied to the air cooled resistor, whereby the air cooled resistor dissipates the electric power generated by the electric traction motor. This may be particularly applicable when e.g. the state-of-charge level of the battery is above a predetermined threshold limit.

Effects and features of the second and third aspects are largely analogous to those described above in relation to the first aspect.

Further features of, and advantages will become apparent when studying the appended claims and the following description. The skilled person will realize that different features may be combined to create embodiments other than those described in the following, without departing from the scope of the present disclosure.

BRIEF DESCRIPTION OF THE DRAWINGS

The above, as well as additional objects, features, and advantages, will be better understood through the following illustrative and non-limiting detailed description of exemplary embodiments, wherein.

DETAILED DESCRIPTION

Figure 1:
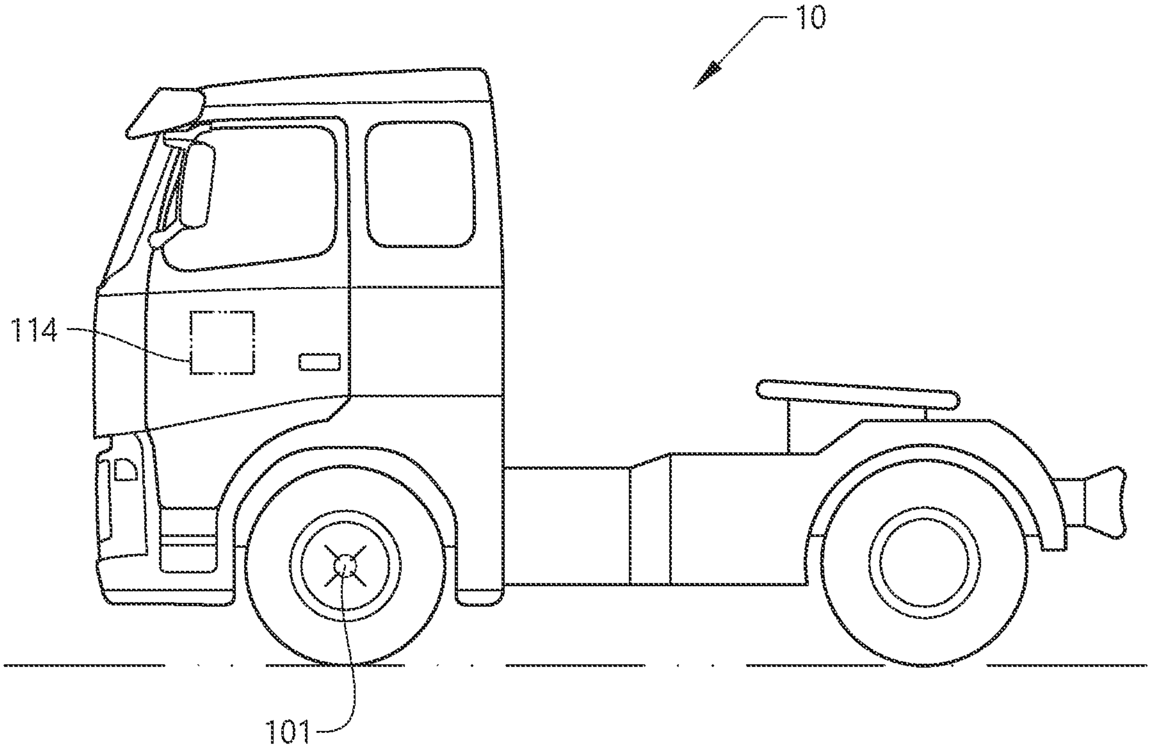
FIG. 1 is a lateral side view illustrating an example embodiment of a vehicle in the form of a truck.

The present invention will now be described more fully hereinafter with reference to the accompanying drawings, in which exemplary embodiments are shown. The invention may, however, be embodied in many different forms and should not be construed as limited to the embodiments set forth herein; rather, these embodiments are provided for thoroughness and completeness. Like reference character refer to like elements throughout the description.

With particular reference to FIG. 1, there is depicted a vehicle 10 in the form of a truck. The vehicle comprises a traction motor 101 for propelling the wheels of the vehicle. In FIG. 1, the truck is depicted as being front wheel driven but is should be readily understood that the invention is equally applicable for a rear wheel driven truck, or a four wheel driven truck, etc. The traction motor 101 is in the example embodiment an electric traction motor 101 in the form of an electric machine, which is arranged to receive electric power from a source of electric power (104 in FIG. 2), which may be e.g. an electric power system and/or a fuel cell system. The vehicle 10 also comprises a control unit 114 for controlling various operations as will also be described in further detail below, and a braking system (not shown in detail in FIG. 1) operable to perform an auxiliary braking action for the vehicle 10.

The control unit 114 may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit 114 includes a programmable device such as the microprocessor, microcontroller or programmable digital signal processor mentioned above, the processor may further include computer executable code that controls operation of the programmable device.

Figure 2:
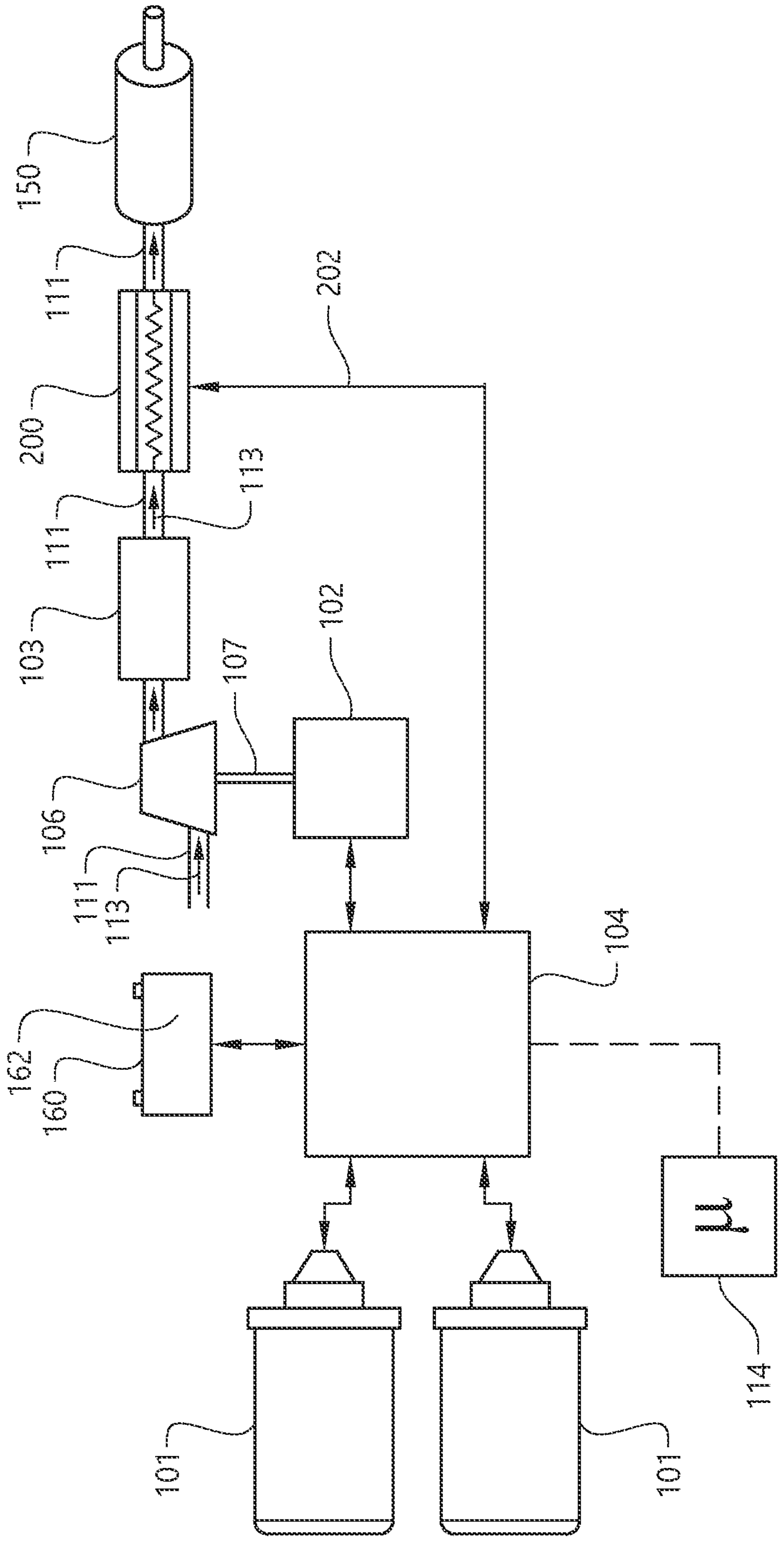
FIG. 2 is a schematic illustration of a braking system according to an example embodiment.

In order to describe the braking system 100 in further detail, reference is made to FIG. 2 which is a schematic illustration of a braking system according to an example embodiment. As can be seen in FIG. 2, the braking system 100 comprises an electric traction motor 101, in FIG. 2 illustrated as a pair of electric traction motors 101. The braking system 100 further comprises an electric power system 104 which is connected to the electric traction motor(s) 101 for supply of electric power to the electric traction motor(s) 101 when the electric traction motor(s) 101 is/are propelling vehicle 10, and to receive electric power from the electric traction motor(s) 101 when the electric traction motor(s) 101 operates in a regenerative braking mode. Thus, the braking system 100 can be referred to as an auxiliary braking system 100.

The source of electric power 104 further comprises an electric storage system 160. The electric storage system 160 is preferably arranged in the form of a vehicle battery and will in the following be referred to as a battery 162. The battery 162 is configured to receive electric power generated by the electric traction motor(s) 101 when the electric traction motor(s) 101 operates in the regenerative braking mode. The battery 162 is also arranged to supply electric power to the electric traction motor(s) 101 when the electric traction motor(s) 101 propel the vehicle 10. Although not depicted in FIG. 2, the source of electric power 104 may comprise various components, such as traction inverters, brake inverters, a junction box, etc.

The above described control unit 114 is connected to the source of electric power 104. The control unit 114 comprises control circuitry for controlling operation of the electric power system. The control unit 114 thus receives data from the source of electric power 104, such as e.g. a state-of-(SOC) of the battery 162, etc, and transmits control signals to the source of electric power 104. As will be evident from the below disclosure, the control signals from the control unit 114 to the source of electric power 104 may, for example, comprise instructions to which device the source of electric power 104 should supply electric power during regenerative braking.

The braking system 100 further comprises an electric machine 102 connected to the source of electric power 104. The electric machine 102 is thus operated by receiving electric power from the source of electric power 104. The electric machine 102 is thus arranged as an electric power consumer. The braking system 100 also comprises an air blower 106. The air blower 106 is preferably an air compressor 106 and will in the following be referred to as such. The air compressor 106 is arranged in an air conduit 111 and configured to receive air 113. The received air 113 is pressurized by the air compressor 106 and supplied further through the air conduit 111 downstream the air compressor 106. The air compressor 106 is connected to, and operable by, the electric machine 102. As illustrated in FIG. 2, the air compressor 106 is mechanically connected to the electric machine 102 by an output shaft 107 of the electric machine 102. In further detail, the air compressor 106 is operated by rotation of the output shaft 107, which rotation is generated by operating the electric machine 102.

According to the non-limiting exemplified embodiment in FIG. 2, the braking system 100 further comprises a flow restriction arrangement 103 in the air conduit 111. The flow restriction arrangement 103 is arranged in downstream fluid communication with the air compressor 106 and configured to increase the pressure level of the flow of air exhausted by the air compressor 106. The braking system 100 also comprises an air cooled resistor arrangement 200 in the air conduit 111.

The air cooled resistor arrangement 200 is arranged in the air conduit 111 in downstream fluid communication with the air compressor 106. The air cooled resistor arrangement 200 is also electrically connected to, and operable by, the source of electric power 104. In particular, the air cooled resistor arrangement 200 is electrically connected to the source of electric power 104 by means of electric wire cabling 202 where, as can be seen in e.g. FIG. 3*a*, an electrically conductive resistor element of the air cooled resistor arrangement 200 comprises supply connections for connecting to the electric wire cabling 202. Thus, also the air cooled resistor arrangement 200 is arranged as an electric power consumer. When the air cooled resistor arrangement 200 receives electric power from the source of electric power 104, the pressurized air 113 from the air compressor is heated by the air cooled resistor arrangement 200, which is described in further detail below with reference to FIGS. 3*a*-5*b*. The pressurized and heated air is thereafter directed towards the ambient environment or other components in need of thermal management. The air from the air cooled resistor arrangement 200 is preferably directed into a muffler 150 of the braking system 100. The muffler 150 reduces noise and can also provide a pressure drop of the air.

Although not depicted in FIG. 2, it should be readily understood that the control unit 114 can be connected to other components in addition to the connection to the source of electric power 104. For example, the control unit 114 may be connected to the electric traction motor(s) 101, the battery 162, the electric machine 102, the air cooled resistor arrangement 200, as well as connected to an upper layer vehicle control system (not shown).

During operation of the braking system 100, i.e. when the electric traction motor 101 operates as generators to control the vehicle speed, i.e. the vehicle 10 operates in the regenerative braking mode, electric power is transmitted from the electric traction motor 101 to the source of electric power 104. If the battery 162 is not able to receive all, or parts of the electric power generated by the electric traction motor 101, for example because of the current electric charging capacity, i.e. the level of electric power the battery is able to receive until being fully charged, has been reached, the excess electric power should preferably be dissipated. In the present case, the source of electric power 104 is controlled to supply electric power to the electric machine 102. The electric machine 102 is hereby, by the received electric power from the electric power system 104, rotating the output shaft 107 to operate the air compressor 107. The air compressor 107 in turn pressurize air 117 and supply the pressurized air further through the air conduit 111.

Accordingly, the control circuitry of the control unit 114 determines a level of electric power dissipation for the source of electric power 104, i.e. a level of electric power that should be dissipated since it is not suitable to supply such power to the battery 162. The level of electric power dissipation is hence a difference between the level of electric power generated during the regenerative braking and the current electric charging capacity of the battery 162. If the electric machine 102 is able to handle, i.e. receive and be operated by, electric power corresponding to the level of electric power dissipation, all excess electric power, i.e. the generated power not being supplied to the battery 162 for charging, is supplied to the electric machine 102.

However, there may be situations where the electric machine 102 is unable to receive a sufficient amount of electric power, or there is a desire to split the electric power between components of the braking system. For example, electric machine 102 may have a motor dissipation threshold. In further detail, the motor dissipation threshold is a maximum capacity of how much electric power the electric machine 102 can receive. Another limiting factor could be a temperature level of the air compressor 106, as well as a temperature level of the electric machine 102, e.g. at high ambient temperature conditions. If the electric machine 102 receives too much electric power, the rotational speed of the output shaft 107 is at a risk of being too high, or the temperature level of the air compressor 106 could be too high.

As such, the control circuitry of the control unit 114 may hereby control the source of electric power 104 to supply electric power also to the air cooled resistor arrangement 200. The source of electric power 104 may be controlled to supply electric power also to the air cooled resistor arrangement 200 for other reasons than the electric power level being higher than the motor dissipation threshold, for example to simply reduce the rotational speed of the output shaft 107 to reduce the operation of the air compressor 106, i.e. the speed of the air compressor 106. The split of electric power supply to the electric machine 102 and the air cooled resistor arrangement 200 can also, for example, be controlled to provide a desired brake performance, a low outlet temperature and/or to reduce wear of components of the braking system 100, etc. In particular, the temperature level of the air cooled resistor arrangement 200 may be used as an input parameter when determining how much electric power to supply to the electric machine 102.

Figure 3A:
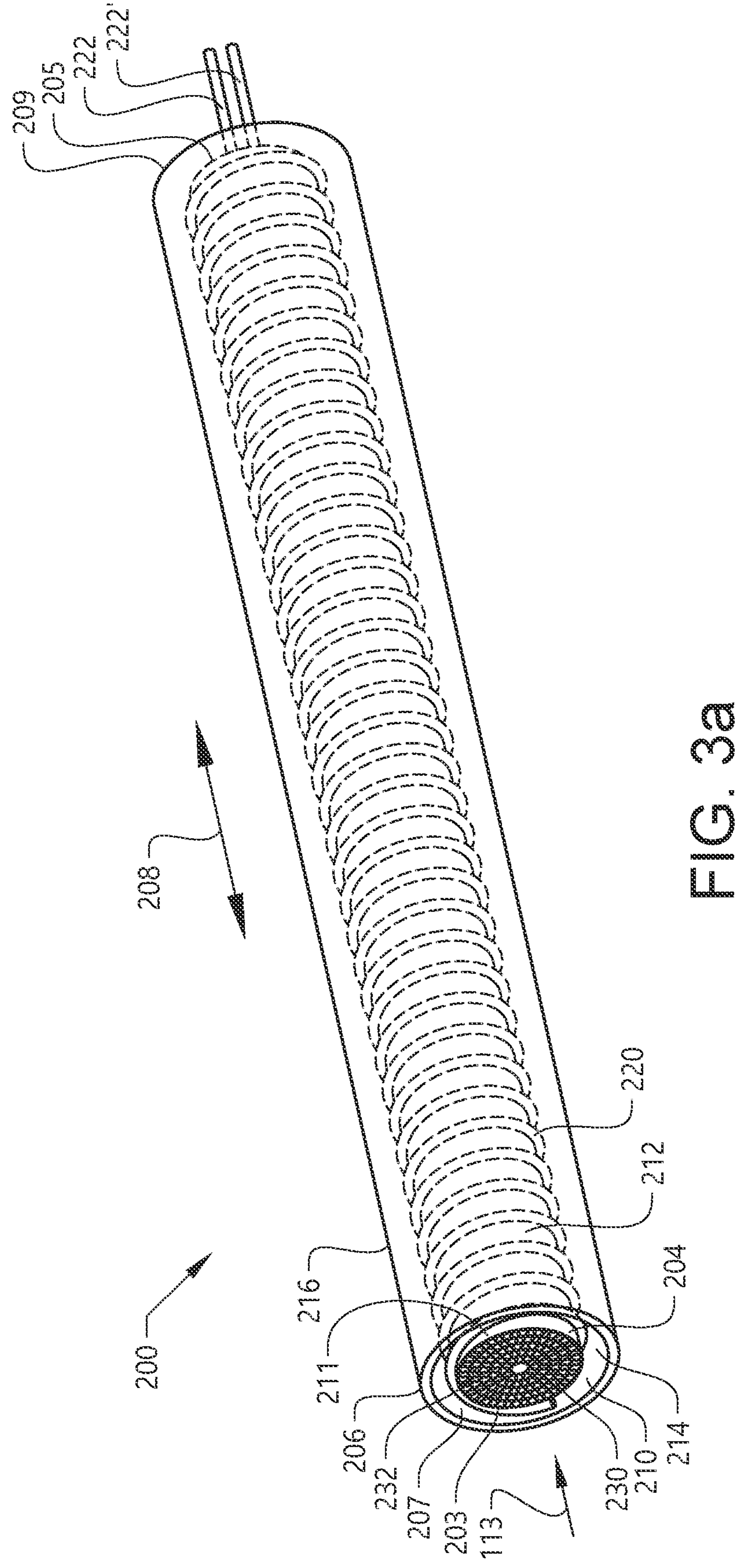
FIG. 3*a* is a perspective view of an air cooled resistor arrangement according to an example embodiment.

In order to describe the air cooled resistor arrangement in further detail, reference is now made to FIG. 3*a*. FIG. 3*a* is a perspective view of an air cooled resistor arrangement according to an example embodiment. As can be seen, the air cooled resistor arrangement 200 comprises a first elongated tube member 204, which can also be referred to as an inner tube. In particular, the first elongated tube member 204 extends in an axial direction 208 from a first open inlet portion 203 to a first open outlet portion 205. The air cooled resistor arrangement 200 also comprises a second elongated tube member 206, which can be referred to as an outer tube. The second elongated tube member 206 extends in the axial direction from a second open inlet portion 207 to a second outlet portion 209. Thus, and as can be seen in FIG. 3*a*, the first elongated tube member 204 is housed by the second elongated tube member 206 in the axial direction 208 of the air cooled resistor arrangement 200 and the first 203 and second 207 open inlet portions allow the air 113 to enter the first 204 and second 206 elongated tube members. The air 113 is travelling through the first 204 and second 206 elongated tube members and is exhausted through the first 205 and second 209 open outlet portions.

In yet further detail, the first 204 and second 206 elongated tube members are spaced apart from each other in the radial direction along the axial direction 208 such that an air gap 210 is formed between the first 204 and second 206 elongated tube members. Each of the first 204 and second 206 elongated tube members has an inner surface and an outer surface. The inner surface 211 of the first elongated tube member 204 is facing an axially extending geometric centre axis. The outer surface 212 of the first elongated tube member 204 and the inner surface 214 of the second elongated tube member 206 are facing each other, while the outer surface 216 of the second elongated tube member 206 is facing away from the first elongated tube member 204. A diameter of the outer surface 212 of the first elongated tube member 204 is thus smaller compared to a diameter of the inner surface 214 of the second elongated tube member 206 to form the air gap 210 therebetween.

The air cooled resistor 200 further comprises an electrically conductive resistor element 220. The electrically conductive resistor element 220 is electrically connected to the source of electric power (104 in FIG. 2). In particular, supply connections 222, 222' of the electrically conductive resistor element 220 is connected to the electric wire cabling 202 for electrically connecting the electrically conductive resistor element 220 to the source of electric power 104.

The electrically conductive resistor element 220 comprises, or is formed by, an electric resistive material and is configured resist the conduction of electric current received from the source of electric power 104. As can be seen in FIG. 3*a*, the electrically conductive resistor element 220 is arranged on the outer surface 212 of the first elongated tube member 204. Although not depicted in FIG. 3*a*, the electrically conductive resistor element 220 could be provided with an electrical isolation around the windings. When electric power is received by the electrically conductive resistor element 220 from the source of electric power 104, the electrically conductive resistor element 220 is heated. Since the electrically conductive resistor element 220 is arranged on the first elongated tube member 204, also the first elongated tube member 204 is heated.

As described above, air 113 is supplied into the first 203 and second 207 open inlet portions. The air 113 is thus flowing through the air cooled resistor arrangement 200, through the first elongated tube member 204 as well as through the air gap 210 formed between the first 204 and second 206 elongated tube members. The air 113 will hereby be heated by the heat generated by the electrically conductive resistor element 220 when travelling between the open inlet portions 203, 207 and the open outlet portions 205, 209.

Moreover, the first 204 and second 206 elongated tube members are in FIG. 3*a* exemplified as having a circular cross section. Also, the first 204 and second 206 elongated tube members are arranged as solid structures along the axial direction, i.e. they are only open at the first and second open inlet portions as well as at the first and second open outlet portions. To put it differently, the first 204 and second 206 elongated tube members are closed in a direction which is perpendicular to the axial direction 208 between the open inlet and outlet portions.

As exemplified in FIG. 3*a*, the electrically conductive resistor element 220 is arranged on the surface of the first elongated tube member 204 along the entire surface from the first open inlet portion 203 to the first open outlet portion 205. As is also exemplified in FIG. 3*a*, the electrically conductive resistor element 220 is arranged as a resistor winding around the surface of the first elongated tube member 204 and extends along the elongation of the first elongated tube member 204. To put it differently, the resistor winding is arranged in the form of a coil spring enclosing the first elongated tube member 204. Although FIG. 3*a* illustrates the electrically conductive resistor element 220 as arranged on the outer surface 212 of the first elongated tube member 204, the electrically conductive resistor element 220 can also be integrated in the surface of the first elongated tube member 204.

As is also exemplified in FIG. 3*a*, the air cooled resistor arrangement 200 comprises a heat conductive structure 230. The heat conductive structure 230 is arranged on the first elongated tube member 204, preferably on the inner surface, e.g. on an inner wall portion of the first elongated tube member 204. As exemplified in FIG. 3*a*, the heat conductive structure 230 is arranged in a honeycomb pattern 232 and extends radially in a direction away from the second elongated tube member 206, i.e. towards the axially extending geometric centre axis. Preferably, the heat conductive structure 230 also extends in a direction parallel to the extension of the first elongated tube member 204, i.e. in the axial direction 208. According to an example, the conductive structure 230 extends along the first elongated tube member 204 form the first open inlet portion 203 to the first open outlet portion 205.

Figure 3B:
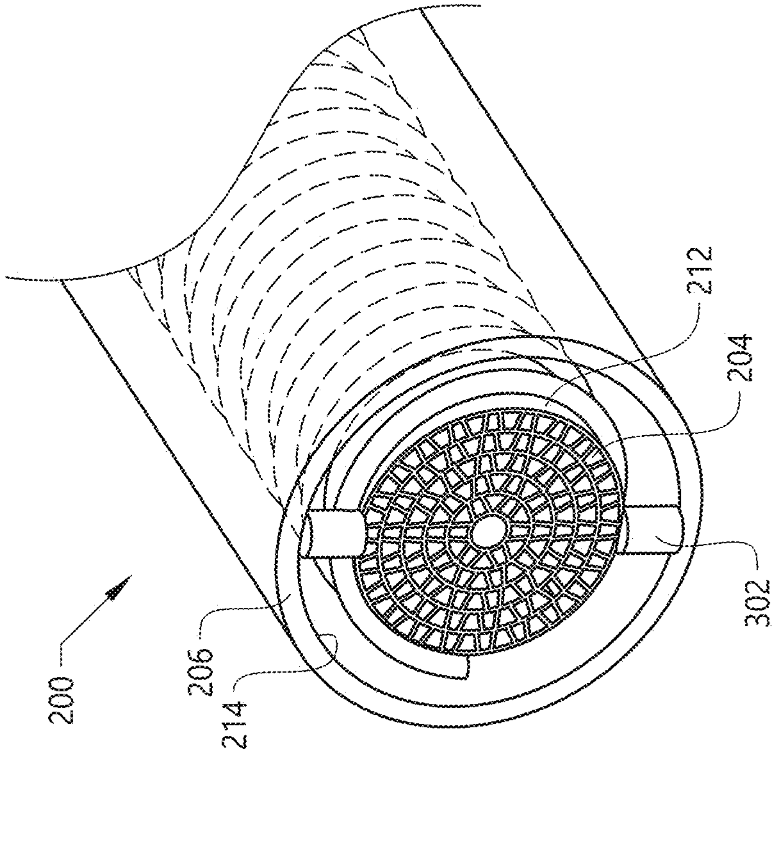
FIG. 3*b* is a detailed schematic illustration of the air cooled resistor arranged in FIG. 3*a* according to an example embodiment.

Turning now to FIG. 3*b* which is a detailed schematic illustration of the air cooled resistor arranged in FIG. 3*a* according to an example embodiment. As can be seen in FIG. 3*b*, the air cooled resistor arrangement 200 also comprises at least one, in FIG. 3*b* illustrated as two, connecting elements 302. The connecting element 302 is arranged between the first elongated tube member 204 and the second elongated tube member 206. In particular, the connecting element 302 is arranged between outer surface 202 of the first elongated tube member 204 and the inner surface 214 of the second elongated tube member 206. The connecting element 302 is thus connected to the outer surface 202 of the first elongated tube member 204 and to the inner surface 214 of the second elongated tube member 206.

The connecting element 302 is in FIG. 3*b* depicted as positioned at the open inlet portions. However, the connecting element 302 may be positioned elsewhere along the elongation of the first 204 and second 206 tube members. Also, a plurality of connecting elements 302 may be provided along the elongation of the first 204 and second 206 tube members. Such a plurality of connecting elements 302 are preferably distributed along the elongation at even intervals.

Moreover, the connecting element 302 is preferably formed by an electrically insulating material to reduce the risk of accidentally transmit electric power to the second elongated tube member 206.

Figure 4:
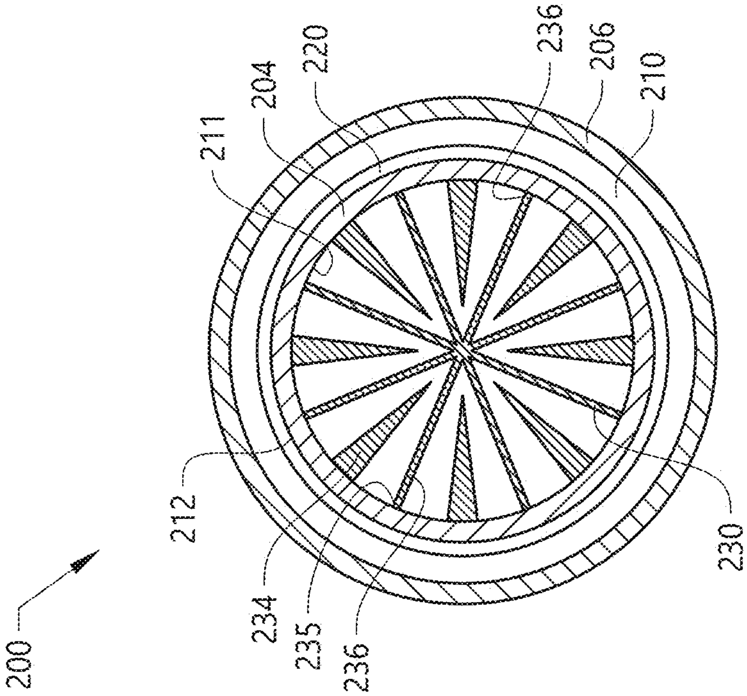
FIG. 4 is a cross-sectional view of the air cooled resistor arrangement according to another example embodiment.
Figure 5B:
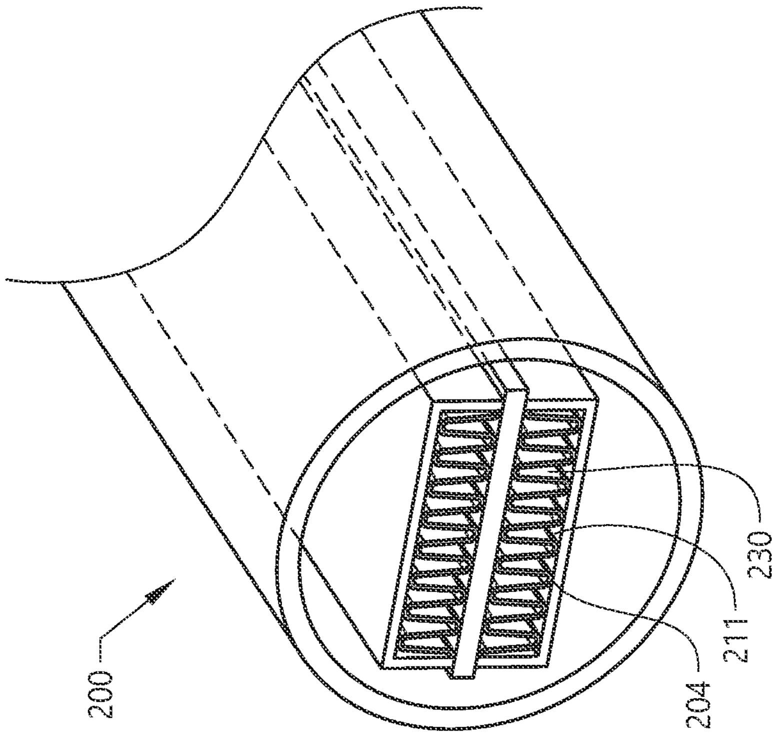
FIGS. 5*a*-5*b* are perspective view of an alternative cross-section for the first elongated tube member of the air cooled resistor arrangement according to an example embodiment.

In order to describe the air cooled resistor arrangement according to further example embodiments, reference is made to FIGS. 4-5*b*. The above described connecting elements 302 are omitted from the description and illustration of FIGS. 4-5*b* but should be construed as an alternative implementation also for these example embodiments.

Starting with FIG. 4 which is a cross-sectional view of the air cooled resistor arrangement 200 according to another example embodiment. In a similar vein as the air cooled resistor 200 described above in relation to FIGS. 3*a*-3*b*, the air cooled resistor 200 depicted in FIG. 4 comprises a first 204 and second 206 elongated tube member arranged to form the air gap 210 therebetween.

In the embodiment depicted in FIG. 4, the electrically conductive resistor element 220 is wrapped around the outer surface 212 of the first elongated tube member 204. Further, the air cooled resistor arrangement 200 comprises a heat conductive structure 230 arranged on the inner surface 211 of the first elongated tube member 204. The heat conductive structure 230 extends radially inwards from the inner surface 211 of the first elongated tube member 204. In a similar vein as described above, the heat conductive structure 230 may also extend along the axial direction 208 of the first elongated tube member 204.

As exemplified in FIG. 4, the heat conductive structure 230 is formed by a plurality of taper shaped elements 234 arranged on the inner wall portion of the first elongated tube member. The heat conductive structure 230 is in FIG. 4 also formed by a plurality of radially extending heat structures 234 having a first end 235 and a second end 236, where each of the first 235 and second 236 ends are connected to the inner surface 211 of the first elongated tube member 204. The flow of air 113 is thus flowing through the first elongated tube member 204 and heated by the inner surface 211 of the first elongated tube member 204 as well as heated by the heat conductive structure 230.

Figure 5A:
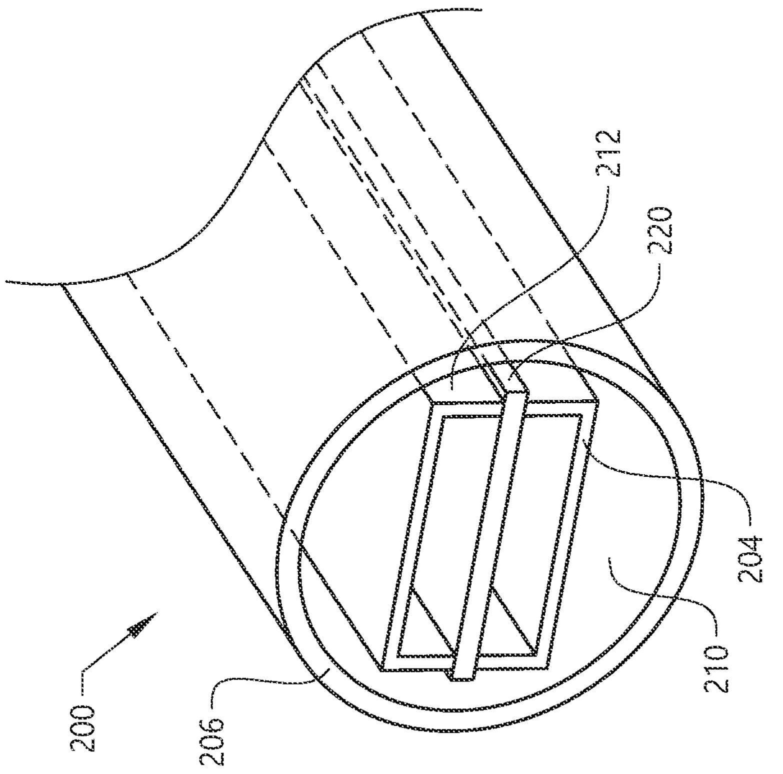

Turning now to FIGS. 5*a*-5*b*, which are perspective views of an alternative cross-section of the first elongated tube member 204 according to example embodiment. As is illustrated in FIGS. 5*a*-5*b*, the cross-section of the first elongated tube member 204 is rectangular compared to the circular cross-section illustrated in FIGS. 3*a*-4. The electrically conductive resistor element 220 is arranged on the outer surface 212 of the first elongated tube member 204. In a similar vein as described above, an air gap 210 is formed between the first 204 and second 206 elongated tube members.

As depicted in the exemplified embodiment of FIG. 5*b*, the air cooled resistor arrangement 200 may also comprise a heat conductive structure 230 arranged on the inner surface 211 of the first elongated tube member 204. In the exemplified embodiment of FIG. 5*b*, the heat conductive structure 230 is arranged in a wave-shaped pattern.

It is to be understood that the present disclosure is not limited to the embodiments described above and illustrated in the drawings; rather, the skilled person will recognize that many changes and modifications may be made within the scope of the appended claims.

The invention claimed is:

1. An air cooled resistor arrangement, comprising:

a first elongated tube member comprising a first open inlet portion and a first open outlet portion, the first elongated tube member extending from the first open inlet portion to the first open outlet portion, a second elongated tube member comprising a second open inlet portion and a second open outlet portion, the second elongated tube member extending from the second open inlet portion to the second open outlet portion, and an electrically conductive resistor element comprising an electric resistive material, the resistor element being connectable to a source of electric power, wherein the resistor element is arranged on a surface of the first elongated tube member, wherein the first elongated tube member is housed inside the second elongated tube member, the first elongated tube member and the second elongated tube member being spaced apart from each other continuously along the extension of the first elongated tube member by an air gap perpendicular to the extension of the first elongated tube member such that a flow of air entering the air cooled resistor arrangement is directed through the first elongated tube member and through the air gap, and heated by the resistor element before being exhausted through the first and the second open outlet portions.

2. The air cooled resistor arrangement of claim 1, wherein the second elongated tube member is closed in a direction perpendicular to the elongation of the second elongated tube member between the second inlet portion and the second outlet portion.

3. The air cooled resistor arrangement of claim 1, wherein the first elongated tube member is closed in a direction perpendicular to the elongation of the first elongated tube member between the first inlet portion and the first outlet portion.

4. The air cooled resistor arrangement of claim 1, wherein the resistor element extends between the first open inlet portion and the first open outlet portion.

5. The air cooled resistor arrangement of claim 1, wherein the air cooled resistor arrangement further comprises at least one connecting element, the at least one connecting element connecting the first and the second elongated tube members to each other.

6. The air cooled resistor arrangement of claim 5, wherein the at least one connecting element is formed by an electrically insulating material.

7. The air cooled resistor arrangement of claim 1, wherein the first elongated tube member comprises a heat conductive structure, the heat conductive structure arranged on an inner wall portion of the first elongated tube member and extends in a direction perpendicular to the extension of the first elongated tube member and away from the second elongated tube member.

8. The air cooled resistor arrangement of claim 7, wherein the heat conductive structure extends in a direction parallel with the extension of the first elongated tube member.

9. The air cooled resistor arrangement of claim 8, wherein the heat conductive structure extends from the first open inlet portion to the first open outlet portion.

10. The air cooled resistor arrangement of claim 7, wherein the heat conductive structure is arranged in a honeycomb pattern.

11. The air cooled resistor arrangement of claim 7, wherein the heat conductive structure is formed by a plurality of taper shaped elements arranged on the inner wall portion of the first elongated tube member.

12. The air cooled resistor arrangement of claim 1, wherein the second elongated tube member has a circular cross section.

13. The air cooled resistor arrangement of claim 1, wherein the resistor element is formed by at least one resistor winding arranged around the surface of the first elongated tube member.

14. A braking system for a vehicle, comprising:

an electric traction motor configured to propel the vehicle and to controllably regenerate electric power during regenerative braking of the vehicle, an electric machine comprising an output shaft, an air blower connected to the output shaft of the electric machine, the air blower being operable by the electric machine by rotation of the output shaft, wherein the air blower is arranged in an air conduit, the air cooled resistor arrangement of claim 1, and a source of electric power electrically connected to the electric machine and to the electrically conductive resistor element of the air cooled resistor arrangement, the source of electric power comprising an electric storage system configured to receive and supply electric power, wherein the electric machine and the air cooled resistor arrangement are operated by electric power received from the electric storage system, the electric storage system being further electrically connected to the electric traction motor and configured to receive electric power during regenerative braking.

15. A vehicle, comprising:

an electric traction motor configured to propel the vehicle, a source of electric power comprising an electric storage system, wherein the source of electric power is electrically connected to the electric traction motor, and the air cooled resistor arrangement of claim 1, wherein the electrically conductive resistor element is electrically connected to the source of electric power for dissipating electric power generated by the electric traction motor during braking.

* * * * *